United States Patent
Cooper et al.

(10) Patent No.: US 8,356,123 B2
(45) Date of Patent: Jan. 15, 2013

(54) APPARATUS AND METHOD FOR STORING CONTEXT INFORMATION ON AN ELECTRONIC DEVICE

(75) Inventors: Steven L. Cooper, Whitestown, IN (US); James Duane Tenbarge, Fishers, IN (US)

(73) Assignee: Shenzhen TCL New Technology Ltd, Shenzhen, Guangdong (CN)

( * ) Notice: Subject to any disclaimer, the term of this patent is extended or adjusted under 35 U.S.C. 154(b) by 0 days.

(21) Appl. No.: 13/126,147

(22) PCT Filed: Feb. 19, 2009

(86) PCT No.: PCT/US2009/034530
§ 371 (c)(1),
(2), (4) Date: Apr. 26, 2011

(87) PCT Pub. No.: WO2010/062406
PCT Pub. Date: Jun. 3, 2010

(65) Prior Publication Data
US 2011/0225324 A1  Sep. 15, 2011

(30) Foreign Application Priority Data
Nov. 28, 2008 (CN) .......................... 2008 1 0180168

(51) Int. Cl.
*G06F 3/00* (2006.01)
*H04N 7/18* (2006.01)
*H04N 7/173* (2011.01)
(52) U.S. Cl. .................. 710/19; 710/1; 710/13; 725/80; 725/109
(58) Field of Classification Search ................... 710/1, 8, 710/13, 15, 19; 725/37, 38, 74, 78, 80, 86–103, 725/105, 109
See application file for complete search history.

(56) References Cited

U.S. PATENT DOCUMENTS

| 6,388,961 B1 * | 5/2002 | Ijichi .......................... 369/30.36 |
| 6,750,883 B1 | 6/2004 | Parupudi et al. |
| 2005/0024994 A1 | 2/2005 | Shah et al. |
| 2005/0025465 A1 | 2/2005 | Daniell |
| 2005/0149213 A1 | 7/2005 | Guzek et al. |

(Continued)

FOREIGN PATENT DOCUMENTS
KR  10-2006-0120339 A  11/2006

OTHER PUBLICATIONS
International Search Report for PCT Application No. PCT/2009/034536 dated Dec. 16, 2009, 11 pgs.

(Continued)

*Primary Examiner* — Chun-Kuan Lee
*Assistant Examiner* — Richard B Franklin
(74) *Attorney, Agent, or Firm* — Fletcher Yoder

(57) ABSTRACT

An electronic device includes a storage slot for storing context information for a storage device. The electronic device is configured to apply settings related to the context information to the storage device upon detecting connection of the storage device to the electronic device. A method of operating the electronic device may include acquiring context information from the storage device, storing the context information within a storage slot of the electronic device, and applying settings to the storage device. The settings may be related to the context information and may be applied upon detecting a reconnection of the storage device to the electronic device.

15 Claims, 3 Drawing Sheets

U.S. PATENT DOCUMENTS

| | | |
|---|---|---|
| 2005/0235015 A1 | 10/2005 | Abanami et al. |
| 2006/0047757 A1 | 3/2006 | Geller et al. |
| 2006/0085577 A1 | 4/2006 | Takashima et al. |
| 2007/0046835 A1 | 3/2007 | Kim et al. |
| 2007/0124517 A1 | 5/2007 | Seo et al. |
| 2007/0124772 A1 | 5/2007 | Bennett et al. |
| 2007/0136392 A1 | 6/2007 | Oh et al. |
| 2007/0162395 A1 | 7/2007 | Ben-Yaacov et al. |
| 2008/0005440 A1 | 1/2008 | Li et al. |
| 2008/0075432 A1 | 3/2008 | Cilluffo |
| 2008/0089548 A1 | 4/2008 | Huang |
| 2008/0155467 A1 | 6/2008 | Obita et al. |
| 2008/0256378 A1 | 10/2008 | Guillorit |
| 2010/0017633 A1* | 1/2010 | Inoue ............................ 713/320 |
| 2010/0027966 A1* | 2/2010 | Harrang et al. ................. 386/69 |

OTHER PUBLICATIONS

International Search Report for PCT Application No. PCT/2009/034530 dated Sep. 1, 2009, 12 pgs.

Kelkoo DVD player Buyer's Guide; http://www.kelkoo.co.uk/co_550-dvd-player-guide-dvd-player-buyers-guide.html; printed May 8, 2008, 3 pgs.

International Search Report for PCT Application No. PCT/2009/051030 dated Jan. 4, 2010, 12 pgs.

International Search Report for PCT Application No. PCT/2009/051008 dated Mar. 11, 2010, 11 pgs.

* cited by examiner

APPARATUS AND METHOD FOR STORING CONTEXT INFORMATION ON AN ELECTRONIC DEVICE

FIELD OF THE INVENTION

The present invention relates generally to electronic devices, such as televisions and receivers. More specifically, the present invention relates to electronic devices that support connection of an external storage device.

BACKGROUND OF THE INVENTION

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Storage devices, such as portable media players and flash drives, are common devices for transporting and storing media files. Often, storage devices are connected to electronic devices, such as televisions and receivers, to play media stored on the storage devices. For example, a flash drive may be connected to a television to play a movie or television program stored on the flash drive. Due to the portable nature of the storage devices, they may be connected to electronic devices in various locations. For example, a user may connect a portable media player to a living room television to start watching a movie, and then may move the portable media player to a bedroom television to finish watching the movie.

Contextual settings, such as the playback position, device name, and the last file accessed, may be stored as context information on the storage device. The contextual settings may allow a user to resume operation of the storage device with the same settings used during a previous operation. However, the context information may be lost when the storage device is disconnected from the electronic device. For example, contextual device settings may be lost when the storage device is turned off or used to access a different file. Therefore, a user may need to reapply the contextual device settings after reconnecting the storage device to the electronic device. For example, a user may need to fast forward through a video file to locate a previously paused playback position. The reapplication of contextual device settings may require navigation through menus of the storage device and may be time consuming and inconvenient.

DETAILED DESCRIPTION OF THE PREFERRED EMBODIMENT

Figure 1:
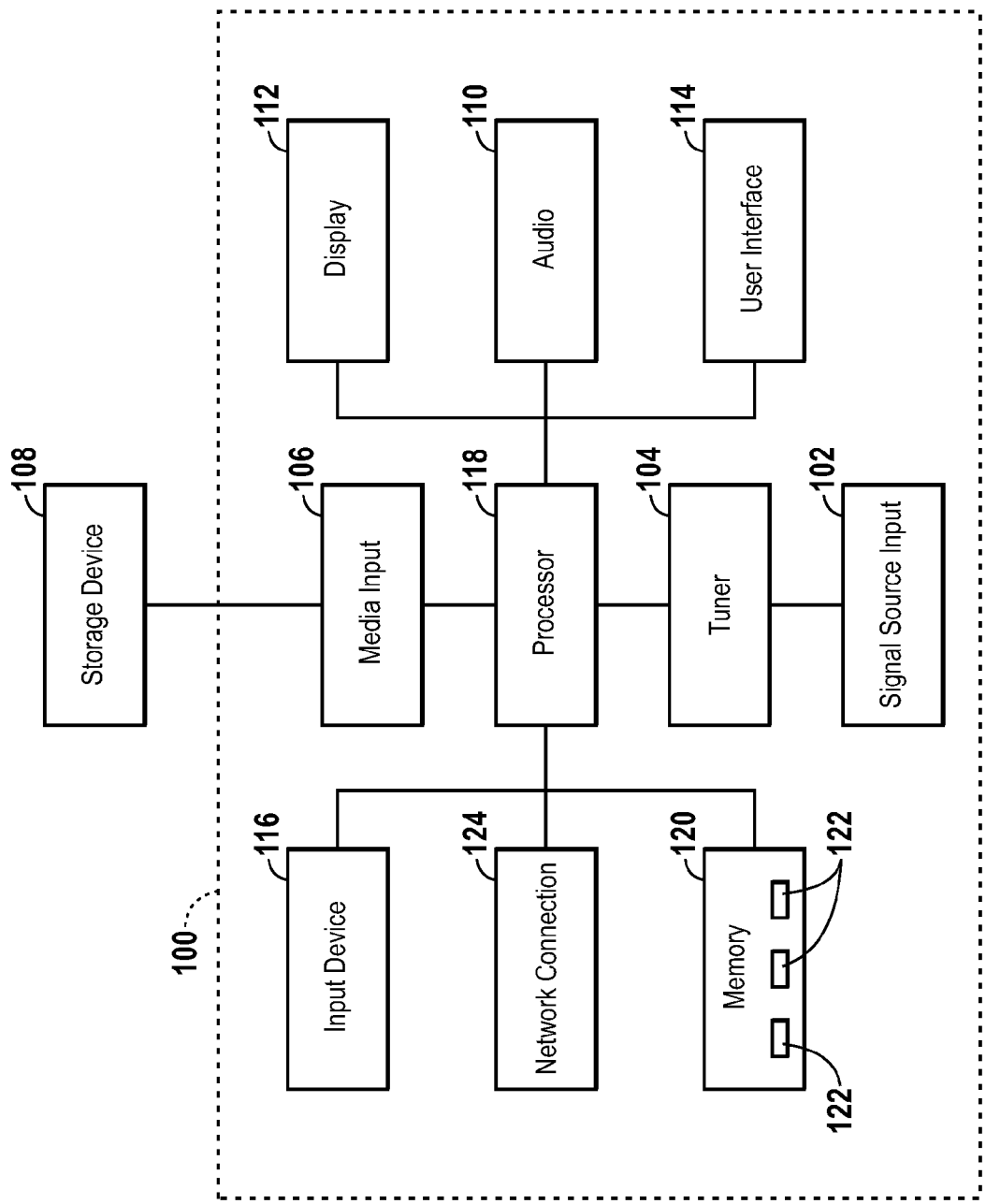
FIG. 1 is a block diagram of an electronic device in accordance with present embodiments.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments are directed to an electronic device (e.g., a television, computer, or receiver) or system of electronic devices that may receive context information from a connected storage device and store the context information. The context information may include settings related to the storage device environment, such as the last playback location of media on the storage device accessed from the electronic device, the last file accessed or played, and the storage device name, model, and serial number. The context information may be used during subsequent access to the storage device to resume operation of the storage device or to access media on the storage device with the same settings that were applied during a previous use. For example, the context information may include a playback location that allows a user to resume playing a movie from a previously paused location.

According to present embodiments, the electronic device includes storage slots for storing the context information within a non-volatile portion of memory. The context information may be stored on the electronic device even after disconnection of the storage device, and may be applied to the storage device upon reconnection of the storage device to the same electronic device or to a networked electronic device.

The context information may be shared between electronic devices within an electronic device system or network. The system may include multiple electronic devices connected by a network. Context information stored on an electronic device within the system may be transmitted through the network to another electronic device within the system. The network may allow context information from one electronic device to be applied upon connection of the storage device to another electronic device within the system. For example, the storage device may be first connected to a living room television and then moved to a bedroom television. Upon connection of the storage device to the bedroom television, the context information may be received over the network and applied to resume operation with the same context settings that were previously used during connection to the living room television. Transmission of the context information within an electronic device system may allow a storage device to be transferred between electronic devices within the system while the same contextual settings are applied. Specifically, for example, a user may begin watching a movie stored on a storage device on a first television in the network, then resume watching the movie at a second television in the network by moving the storage device from the first television to the second television. The second television may access context information for the storage device that is stored on the first television, and apply that information to the storage device after connection to the second television so that a user may resume watching the movie where it was last accessed and with the same visual settings used during connection to the first television.

FIG. 1 is a block diagram of an electronic device in accordance with an embodiment of the present invention. The electronic device is generally indicated by the reference number 100. The electronic device 100 (a television, for example) comprises various subsystems represented as functional blocks in FIG. 1. Those of ordinary skill in the art will appreciate that the some of the functional blocks shown in FIG. 1 may comprise hardware elements (including circuitry), software elements (including computer code stored on a machine-readable medium), or a combination of both hardware and software elements.

The electronic device 100 includes a signal source input 102 for receiving media to present via the electronic device 100. The signal source input 102 may include an antenna input, an RCA input, an S-Video input, a radio frequency input, or the like. Those of ordinary skill in the art will appreciate that the signal source input 102 may be representative of multiple inputs. The signal source input 102 is configured to receive a signal that comprises video data and/or audio data. The signal received by the signal source input 102 may include a broadcast spectrum (e.g., if the signal source input 102 comprises an antenna input), a television broadcast received from a cable or satellite receiver, or a single channel of video and/or audio data (e.g., if the signal source input 102 comprises a DVD player input, or the like).

In the illustrated embodiment, a tuner 104 is configured to tune a particular video program from a broadcast signal received from the signal source input 102. For example, the tuner 104 may be used to select and tune a channel from a variety of channels provided through cable television to display a program being broadcast on the tuned channel. In some embodiments, the tuner 104 may be bypassed if the signal source input 102 receives a signal that does not require tuning, such as a stored video signal. Indeed, those of ordinary skill in the art will appreciate that input signals that are not received as part of a broadcast spectrum may bypass the tuner 104 because tuning is not required to isolate a video program associated with those signals.

The electronic device 100 also includes a media input 106 for receiving media to present via the electronic device 100. The media input 106 may include a wireless connection, a serial connection, a Universal Serial Bus (USB) connection, an Inter-Integrated Circuit ($I^2C$) connection, or other suitable connection for communicating with an external storage device 108. The media input 106 may be configured to allow communication of media files and information from the storage device 108 to the electronic device 100. For example, movies may be transferred or streamed from the storage device 108 to the electronic device 100 through the media input 106. Moreover, context information, such as the storage device name, brand, and model, the preferred volume, the last played media file, and the like, may be transmitted to the electronic device 100 from the storage device 108 via the media input 106.

The storage device 108 includes a portable device configured to store media files, such as digital images, audio files, video files, and the like. The storage device 108 may include an independent device, such as an iPod®, capable of playing media even when not connected to an external electronic device. The storage device 108 also may include a memory device such as a flash drive, a hard disk drive, portable DVD player, or the like. Those of ordinary skill in the art will appreciate that the media input 106 may be representative of multiple inputs, allowing connection to many portable media players and/or other external devices.

An audio subsystem 110 and a display subsystem 112 of the device 100 are configured to play the audio and video information received from the signal source input 102 and the media input 106. The audio subsystem 110 may include an audio amplifier and one or more speakers configured to play audio data. For example, the audio subsystem 110 may play music received from the portable media player 108. The display subsystem 112 may include a lighting source and a display, such as a liquid crystal display, a light emitting diode display, a plasma display panel, or a digital light projection display configured to play video data. In operation, the display subsystem 112 may display album art or videos received from the storage device 108. As those skilled in the art will appreciate, the audio subsystem 110 and display subsystem 112 may be integrated into the electronic device 100 or may be external components connected to the external device. For example, according to certain embodiments, the electronic device 100 may include a satellite receiver connected to a television.

A user interface 114 may include a textual or graphical user interface having a plurality of menus, viewable through the display subsystem 112. The user interface 114 may be configured to allow a user to adjust various settings and/or options for the electronic device 100, such as memory priorities and display settings. An input device 116, such as a remote control, may be used to navigate through the user interface 114. The input device 116 may include control features, such as selection buttons, dials, knobs, or the like disposed on an outer surface of the device 100. According to present embodiments, the input device 116 may include a remote control configured to communicate with the electronic device 100 via infrared signals. For example, a user may press a button on the input device 116 to select items displayed on the user interface 114.

A processor 118 of the device 100 may be configured to control operation of the electronic device 100 and cooperate with a memory 120. The memory 120 may store executable code, data, and instructions for the processor 118. For example, the memory 120 may be configured to hold machine-readable code for operating the storage device 108 in accordance with present embodiments. The processor 118 may utilize the code stored in the memory 120 to perform certain methods in accordance with present embodiments, including storing, acquiring, and retrieving context information. The memory 120 may include volatile memory, such as random access memory (RAM), and non-volatile memory, such as read only memory (ROM).

The memory 120 includes one or more storage slots 122 configured to store context information for storage devices. The context information may include settings that determine how data stored on the storage device 108 is played. According to present embodiments, the context information may include a playback location within a file or playlist, the identity of the most recently viewed or loaded file, the preferred volume, and the like. The context information also may include data used to identify the storage device 108 such as the device name, model, brand, and serial number. Storage of context information on the electronic device 100 allows the context information to be consistently applied to the corresponding storage device 108 upon connection of the storage device 108 to the electronic device 100.

The storage slots 122 may be a non-volatile storage type, such as flash memory, electrically erasable programmable memory (EEPROM), and the like. As those of ordinary skill in the art will appreciate, any number of storage slots 122 may be provided. According to present embodiments, the storage slots 122 may be assigned to specific storage devices. The storage slots 122 also may be protected by priorities and passwords. For example, the user interface 114 may include a selectable menu for assigning priorities to each storage slot 122. The priorities may be stored within the memory 120 and may be used to determine which storage slot 122 may be reassigned first if all the storage slots 122 are already assigned to storage devices. The user interface 114 also may include a menu through which a user may select a password for a storage slot 122. The password may be required before reassigning the storage slot 122 to another storage device.

The electronic device 100 may include a network input 124, such as an Ethernet of wireless port, for connecting the device 100 to a network of electronic devices. According to present embodiments, the network input 124 may be used to transfer context information between electronic devices within the system. It should be noted that certain embodiments might not include a network input 124.

The electronic device 100 is configured to store context information for the storage device 108. The context information may be stored within a storage slot 122. According to present embodiments, storage properties, such as the type of information stored, the amount of information stored, and the frequency of storage, may be set through the user interface 114. For example, the user interface 114 may include a menu that allows a user to select various types of context information, such as the last playback location and the preferred volume. By selecting options within the menu, a user may be able to designate the type of context information that is stored. For example, the user interface 114 may be configured to allow a user to specify storage of the last five playback locations, the most recent volume setting, and the last two files accessed. The user also may designate when the context information is stored. For example, the user interface 114 may be configured to allow a user to specify storage of the last playback location upon receiving a pause command. As those skilled in the art will appreciate, certain embodiments may not include selectable menus and the amount, type, and frequency of context information storage may be fixed. Moreover, in certain embodiments, the context information may be stored at set time intervals, for example, every fifteen minutes or when there is an indication that the storage device 108 will be ejected from the electronic device 100.

In present embodiments, the electronic device 100 also is configured to apply the context information to the storage device 108 upon detecting connection of the storage device 108 to the electronic device 100. For example, code stored within the memory 120 may be configured to detect connection of the storage device 108 to the media input 106. Upon detecting connection, the device 100 may be configured to retrieve context information from the storage slot 122 and apply contextual settings corresponding to the context information to the storage device 108. For example, the context information may include the playback location for a movie stored on the storage device 108. Upon reconnection, the electronic device 100 may set the storage device 108 to play the movie from the playback location or access the corresponding media at the indicated location.

Figure 2:
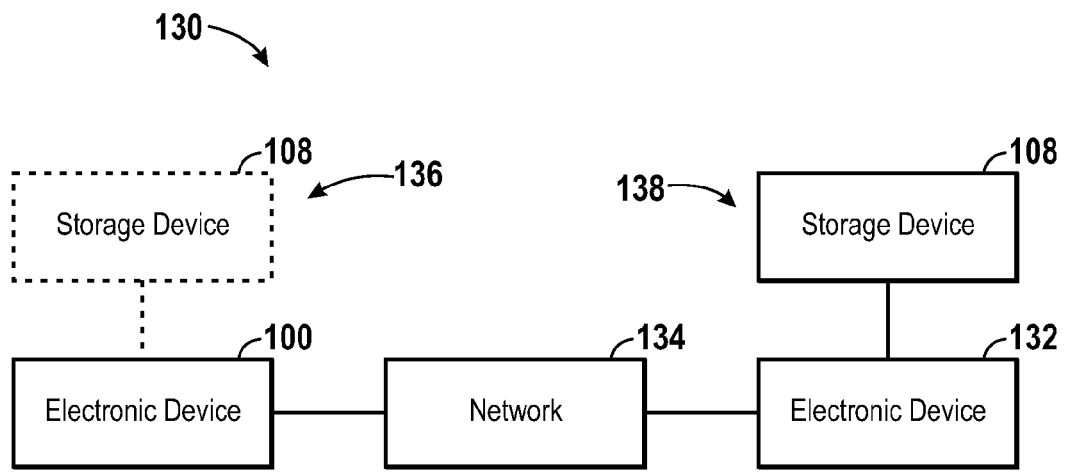
FIG. 2 is a block diagram of a system of electronic devices connected by a network in accordance with present embodiments.

FIG. 2 depicts one embodiment of an electronic device system 130 in accordance with present embodiments. In the illustrated embodiment, an electronic device 132 is connected to the electronic device 100 by a network 134. The network 134 may include wireless connections or cable connections, such as Ethernet cables, configured to allow communication between the devices 100 and 132. The electronic device 132 may include a television, receiver, computer, or other suitable electronic device configured to connect to a storage device.

Both electronic devices 100 and 132 may be configured to connect to the storage device 108. While the storage device 108 is connected to the electronic device 100 or 132, context information for the storage device 108 may be stored on the electronic device 100 or 132. The network 134 is configured to transfer the context information between the electronic devices 100 and 132. For example, when the storage device 108 is connected to the electronic device 100 in the location 136, the electronic device 100 may store context information within a storage slot of the electronic device 100. The storage device 108 may then be disconnected from the electronic device 100 and connected to the electronic device 132 in a second location 138. Upon connection, the electronic device 132 may be configured to search the network 134 for context information associated with the storage device 108. For example, the name and serial number associated with the storage device 108 may be utilized to find associated context information on the network 134. According to present embodiments, protocols and serial buses may be used to transmit the context information between the electronic devices 100 and 132.

After locating the context information, the electronic device 132 may receive the context information from the electronic device 100. The context information may be copied locally to a storage slot of the electronic device 132, or it may be accessed from the network 134 and stored within the volatile memory of the electronic device 132. In certain embodiments, only one electronic device within a network may include storage slots, and these storage slots may be configured to store the context information for the entire network of devices. In other embodiments, multiple electronic devices within the system may include storage slots.

As those skilled in the art will appreciate, any number or electronic devices may be included within the system 130. If a storage device has been connected to multiple devices within the system 130, multiple sets of context information may correspond to the storage device. For example, context information for the storage device 108 may be stored on the electronic device 100 and include settings for the storage device 108 during its use at the location 136. Context information for the storage device 108 also may be stored on the electronic device 132 and include settings for the storage device 108 during its use at the location 138. To facilitate selection of the most recent context information, the context information may include date and time data that allows an electronic device to identify the most recent context information. Indeed, the electronic device may be configured to apply the most recent context information upon connection of a storage device. According to other embodiments, the electronic device may be configured to display the sets of context information on the user interface 118 (FIG. 1) to allow a user to select between the sets of context information.

According to present embodiments, the storage device 108 may be connected to the electronic device 100 in the location 136, which may be a bedroom of a home. In this location, a user may play a video from the storage device 108 on the electronic device 100. During the video, the user may pause the video, disconnect the storage device 108, and move to the location 138, such as a living room, to finish watching the video. The electronic device 100 may be configured to receive and store context information that includes the playback location prior to disconnection of the storage device 108 from the electronic device 100. When the user connects the storage device 108 to the electronic device 132 in the new location 138, the electronic device 132 is configured to search the network for the most recent context information associated with the storage device 108.

The device 132 then receives the context information from electronic device 100 over the network 134. The electronic device 132 may apply the playback location to the storage device 108 so that upon connection of the storage device 108 to the electronic device 132, playback of the video resumes at the paused location. Such transfer of context information between devices allows a user to transfer the storage device to another device within the system and resume operation of the storage device 108 with the same settings.

Figure 3:
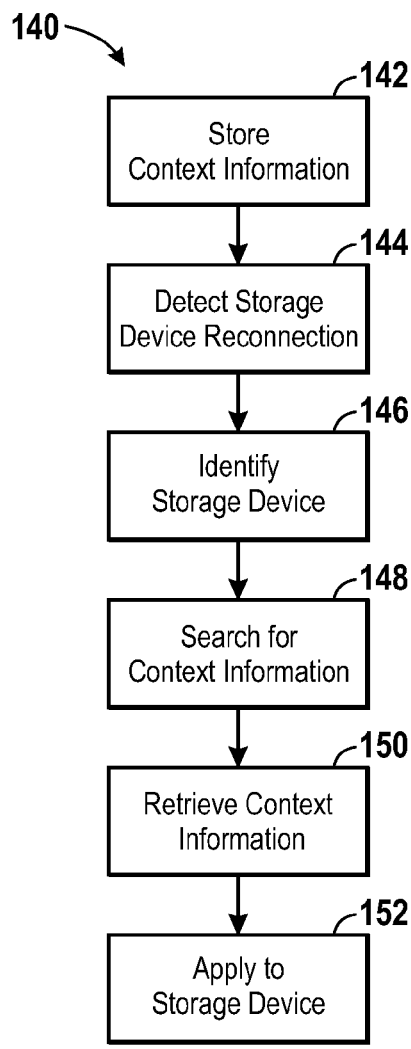
FIG. 3 is a process flow diagram of a method for using context information on an electronic device in accordance with present embodiments.

FIG. 3 is a process flow diagram of a method 140 in accordance with present embodiments. In some embodiments, as those of ordinary skill in the art will appreciate, some steps may be modified, excluded, or additional steps may be included. The method begins with acquiring context information from a storage device and storing the context information (step 142) on an electronic device. The context information may be stored within a storage slot 122 (FIG. 1) and may be stored in response to receiving a command, such as a pause command or a request for disconnection. The context information also may be stored automatically after a set period or may be stored as determined by user settings entered through a user interface 118 (FIG. 1). According to present embodiments, the context information may be stored within an assigned storage slot. For example, each storage slot within an electronic device may be assigned to an individual storage device. According to present embodiments, the context information may be stored while the storage device 108 (FIG. 1) is connected to the electronic device 100 (FIG. 1).

After storage of the context information, the storage device 108 (FIG. 1) may be disconnected from the electronic device 100 (FIG. 1). During disconnection, the storage device 108 (FIG. 1) may be operated in a manner that results in a loss of the context information stored on the storage device itself. For example, the storage device may be turned off, may be accessed using another external device, or may be used to play another type of file. Moreover, some storage devices may not be configured to store context information. The method continues with detecting reconnection of the storage device (step 144). The storage device 108 (FIG. 1) may be reconnected to the same electronic device 100 (FIG. 1), or in the case of a system of networked devices, to another electronic device within the system.

Upon detecting reconnection, the electronic device identifies the storage device (step 146). According to present embodiments, the identification may be performed by requesting identifying context information from the storage device, such as the storage device name, brand, model number, and/or serial number. The identification information may then be used to find the corresponding context information stored on the electronic device, or within the electronic device system.

Using the identification information, the electronic device searches for the context information that corresponds to the connected storage device (step 148). This step may involve searching storage slots 122 (FIG. 1) within an electronic device or system. This step also may include identifying the most recent context information. For example, in an electronic device system, multiple devices may contain context information corresponding to the identified storage device. Code stored within the memory 120 (FIG. 1) may be used to determine which information is the most recent. The electronic device may be configured to select the most recent context information or it may be configured to prompt a user to select the desired context information.

Once the context information has been found, the context information is retrieved (step 150). According to present embodiments, the electronic device may request the context information from the appropriate storage slot using code stored within the memory 120 (FIG. 1). The context information is then applied to the storage device (step 152). For example, if the context information includes the identity of the last file viewed, the electronic device may set the storage device to display the last file viewed. In this manner, a user may resume operation of the storage device using the previous settings even after disconnecting and reconnecting the storage device.

Figure 4:
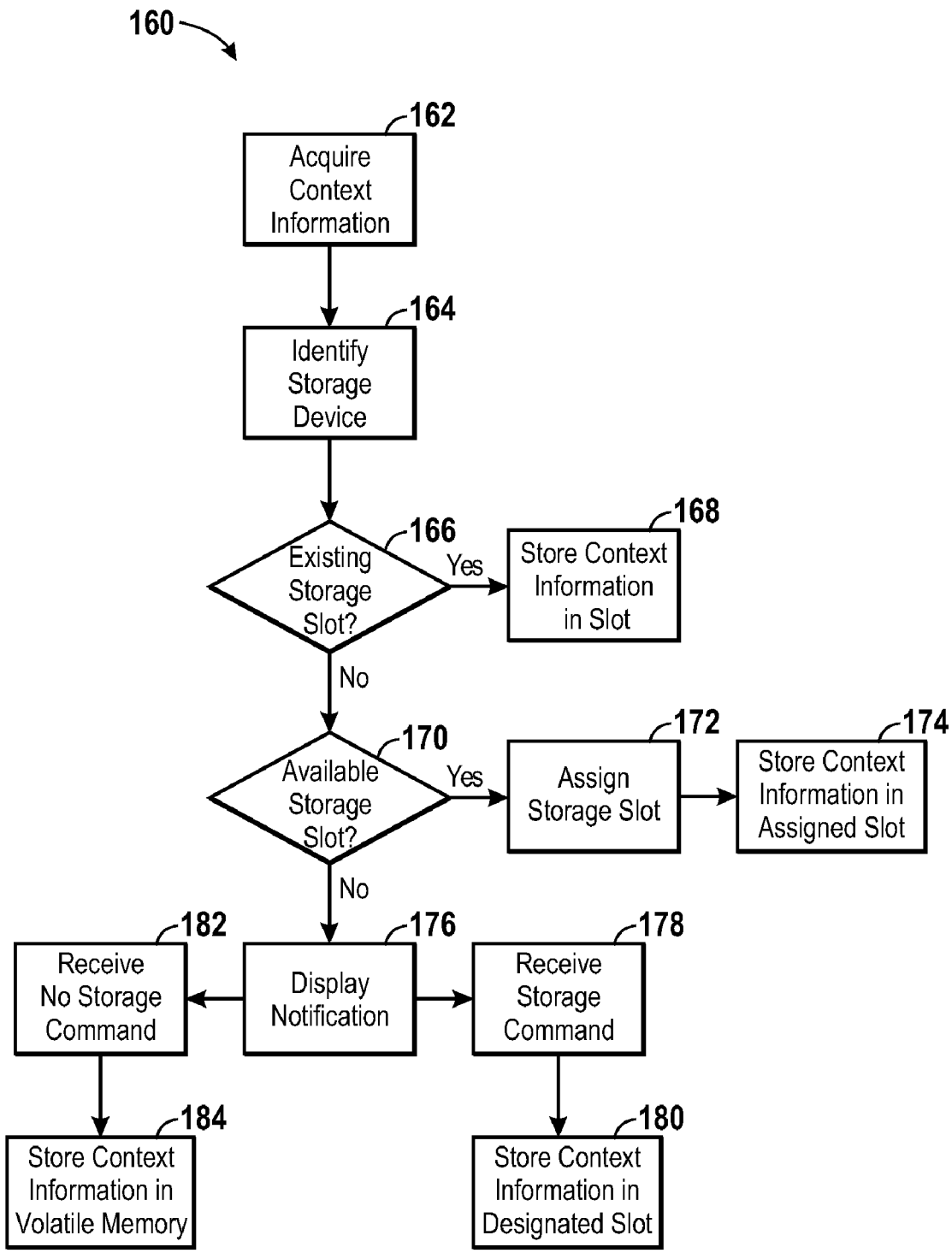
FIG. 4 is a process flow diagram of a method for storing context information on an electronic device in accordance with present embodiments.

FIG. 4 is a process flow diagram of a method 160 in accordance with present embodiments. In some embodiments, as those of ordinary skill in the art will appreciate, some steps may be modified, excluded, or additional steps may be included. The method begins by acquiring context information from a storage device (step 162). The context information may include operational settings such as the playback location and may include identification information such as the model and/or serial number for the storage device. According to present embodiments, the context information may be acquired by requesting the information from the storage device 108 (FIG. 1) using a protocol stored within the memory 120 (FIG. 1) of the electronic device 100 (FIG. 1).

The identification information may be used to identify the storage device (step 164). The electronic device may then determine whether the storage device has an existing assigned storage slot (step 166). If a storage slot has already been assigned to the storage device, the electronic device may store the context information within that storage slot (step 168). According to present embodiments, if the context information overlaps with existing context information already stored in that storage slot, the electronic device may overwrite the existing context information to replace it with the new context information.

If a storage slot has not been assigned to the storage device, the electronic device may then determine if there is an available storage slot (step 170). For example, the electronic device may determine whether each of the storage slots has already been assigned to a storage device. Unassigned storage slots may be available for assignment. If there is an available storage slot, then the electronic device may assign that available storage slot to the storage device (step 172). According to present embodiments, the electronic device may automatically assign the storage device to the next available storage slot. For example, the storage slots may have priorities that determine the order of assignment. The priorities may be fixed or may be set by a user using the user interface 118 (FIG. 1). The assignment links the storage slot to the specific storage device. After assignment, the context information may be stored within the assigned slot (step 174).

If there are no available storage slots, the electronic device may display a notification (step 176). According to present embodiments, the notification may be displayed on the display subsystem 112 (FIG. 1) and may be a graphical or textual display configured to alert a user that no storage slots are available. The notification may prompt the user for a command, which may be sent using the input device 116 (FIG. 1). According to present embodiments, the notification may prompt the user to select between storing the context information in a storage slot assigned to a different storage device and not storing the context information in a storage slot. If the device receives a command designating that the context information will not be stored within a storage slot (step 182) in response to the display notification (step 176), the electronic device may store the context information within a volatile part of the memory (step 184). Consequently, the context information may be lost when the electronic device is powered off. According to other embodiments, the electronic device may not store the context information. Therefore, upon reconnection of the storage device, a user may not be able to resume operation with the previous settings.

If the electronic device receives a storage command (step 178) in response to the display notification (step 176), the context information may be stored in a designated storage slot (step 180). For example, the designated slot may be automatically selected as the lowest priority slot. In this example, the context information currently stored in the slot may correspond to a different storage device and may be replaced with the context information for the newly connected storage device. According to present embodiments, the electronic device may be configured to display a notification on the user interface 118 that alerts the user that context information is about to be replaced. The user interface 118 may include a selectable menu that allows a user to confirm replacement, designate another storage slot for replacement, or elect not to store the context information within a storage slot.

In other embodiments, the designated slot may be assigned by a user via the user interface 118 (FIG. 1). For example, the user interface 118 (FIG. 1) may be configured to prompt the user to enter a storage slot for replacement. Upon receiving a command from the user, such as from the input device 116 (FIG. 1), the electronic device may reassign a storage slot to the currently connected storage device. The context information may then be stored in the designated storage slot (step 180).

As those skilled in the art will appreciate, the method 160 (FIG. 4) may be used in conjunction with the method 140 (FIG. 3). For example, the method 160 may be used to store the context information (step 142) as illustrated in FIG. 3. After the context information is stored, it may be accessed and applied to a storage device (steps 144, 146, 148, 150, and 152 illustrated in FIG. 3).

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of operating an electronic device system, comprising:
   acquiring context information from a storage device during a first connection of the storage device to the electronic device system at a first electronic device of the system;
   storing the context information in a storage slot of the first electronic device;
   detecting a second connection of the storage device to the electronic device system at a second electronic device of the system, wherein the first and second electronic devices are configured to independently play media and are networked together via a network;
   searching the system with the second electronic device for the context information via the network;
   applying settings related to the context information to the storage device via the second electronic device in response to the detecting the second connection; and
   sorting a plurality of context information based on associated date data and applying the settings related to the context information because it has the most recent date.

2. The method of claim 1, wherein the storage slot includes non-volatile storage.

3. The method of claim 2, comprising assigning the storage slot to the storage device, wherein the storage slot is selected and assigned from a plurality of storage slots.

4. The method of claim 3, comprising storing the context information in a volatile memory in response to detecting that each of the plurality of storage slots is assigned.

5. The method of claim 1, wherein the acquiring occurs in response to receiving a pause command and the context information includes a playback location for a video file stored on the storage device.

6. An electronic device system, comprising:
   a network connecting a plurality of electronic devices;
   a media input configured to connect a first device of the plurality of electronic devices to a storage device and receive context information from the storage device;
   a memory including a plurality of storage slots each configured to store context information for the storage device;
   a user interface that allows a user to assign a first storage slot of the plurality of storage slots to the storage device, wherein the user interface includes a notification feature configured to provide notice that each of the plurality of storage slots has been assigned;
   a processor configured to detect connection of the storage device to a second device of the plurality of electronic devices, to search the system for the context information, and to apply settings related to the context information to the storage device in response to detecting connection of the storage device to the second device of the plurality of electronic devices.

7. The system of claim 6, wherein the storage device includes a portable media player.

8. The system of claim 6, wherein the storage slots include flash memory chips located within the memory.

9. The system of claim 6, wherein the processor is configured to play media from the storage device in response to detecting connection and the media is determined using the context information.

10. The system of claim 6, wherein the storage device is independently capable of playing media.

11. An electronic device system, comprising:
   a network connecting a plurality of electronic devices;
   a media input configured to connect a first device of the plurality of electronic devices to a storage device and receive context information from the storage device;
   a memory including a plurality of storage slots each configured to store context information for the storage device;
   a user interface that allows a user to assign a first storage slot of the plurality of storage slots to the storage device, wherein the user interface includes a menu that allows a user to prioritize each of the plurality of storage slots;
   a processor configured to detect connection of the storage device to a second device of the plurality of electronic devices, to search the system for the context information, and to apply settings related to the context information to the storage device in response to detecting connection of the storage device to the second device of the plurality of electronic devices.

12. The system of claim 11, wherein the storage device includes a portable media player.

13. The system of claim 11, wherein the storage slots include flash memory chips located within the memory.

14. The system of claim 11, wherein the processor is configured to play media from the storage device in response to detecting connection and the media is determined using the context information.

15. The system of claim 11, wherein the storage device is independently capable of playing media.

* * * * *